(12) United States Patent
Tavakoli Targhi et al.

(10) Patent No.: US 10,207,656 B2
(45) Date of Patent: Feb. 19, 2019

(54) COMPOSITE MODULE

(71) Applicant: Dura Operating, LLC, Auburn Hills, MI (US)

(72) Inventors: Ali Tavakoli Targhi, Rochester Hills, MI (US); Alex Langreet, Mount Clemens, MI (US); Jamie Zinser, Ferndale, MI (US); Brian Howe, Shelby Township, MI (US); Jinseok Jeon, LaSalle (CA)

(73) Assignee: Dura Operating, LLC, Auburn Hills, MI (US)

( * ) Notice: Subject to any disclaimer, the term of this patent is extended or adjusted under 35 U.S.C. 154(b) by 13 days.

(21) Appl. No.: 15/329,627

(22) PCT Filed: Aug. 12, 2015

(86) PCT No.: PCT/US2015/044853
§ 371 (c)(1),
(2) Date: Jan. 27, 2017

(87) PCT Pub. No.: WO2016/025594
PCT Pub. Date: Feb. 18, 2016

(65) Prior Publication Data
US 2017/0210306 A1    Jul. 27, 2017

Related U.S. Application Data

(60) Provisional application No. 62/036,401, filed on Aug. 12, 2014.

(51) Int. Cl.
*B60R 13/02*    (2006.01)
*B60R 11/02*    (2006.01)
(Continued)

(52) U.S. Cl.
CPC .......... *B60R 13/0268* (2013.01); *B32B 5/024* (2013.01); *B32B 27/20* (2013.01);
(Continued)

(58) Field of Classification Search
CPC . B60R 13/0268; B60R 5/044; B60R 11/0217; B32B 5/024; B32B 27/20;
(Continued)

(56) References Cited

U.S. PATENT DOCUMENTS 4,277,097 A    7/1981  Lalanne
4,634,174 A    1/1987  Kamiya
(Continued)

FOREIGN PATENT DOCUMENTS

DE    102010054195 A1    6/2012
FR       2779403 A1    12/1999
(Continued)

OTHER PUBLICATIONS

Written Opinion & International Search Report for PCT/US2015/044853 dated Oct. 29, 2015, 16 pages.
(Continued)

*Primary Examiner* — Gregory A Blankenship
(74) *Attorney, Agent, or Firm* — Reising Ethington P.C.; Matthew J. Schmidt; Robert E. Ford (57) ABSTRACT

A composite module for a vehicle may be both a structural member and include a finished surface. In at least some embodiments, a composite rear shelf module includes a panel with a reinforced multilayer, multi-laminate fiber reinforced plastic composite structure. The panel may include selectively orientated, continuous fiber reinforced thermoplastic composite layers and/or the panel may include discontinuous fiber reinforced thermoplastic reinforcements. The composite rear shelf module may include a show surface film with a class-A surface, eliminating the need for
(Continued)

a separate layer of carpet or other material. In some embodiments the module has vehicle attachment members for securing the module to the vehicle body, and the stiffness and mass of the module and the arrangement of the vehicle attachment members and reinforcements are tuned to move the natural modes, or natural frequencies, of the panel outside the working frequency range of any speakers or subwoofers.

20 Claims, 10 Drawing Sheets

(51) Int. Cl.
*B32B 5/02* (2006.01)
*B32B 27/20* (2006.01)
*B60R 11/00* (2006.01)
*B29C 45/14* (2006.01)
*B29K 105/12* (2006.01)

(52) U.S. Cl.
CPC ...... *B60R 11/0217* (2013.01); *B29C 45/1418* (2013.01); *B29K 2105/12* (2013.01); *B32B 2260/021* (2013.01); *B32B 2260/046* (2013.01); *B32B 2262/101* (2013.01); *B32B 2605/00* (2013.01); *B60R 2011/0024* (2013.01); *B60R 2013/0287* (2013.01)

(58) Field of Classification Search
CPC ........ B32B 2260/021; B32B 2260/046; B32B 2262/101; B32B 2605/00
USPC ......................................... 296/24.44, 901.01
See application file for complete search history.

(56) References Cited

U.S. PATENT DOCUMENTS

| | | |
|---|---|---|
| 4,728,141 A | 3/1988 | Motozawa et al. |
| 5,171,054 A | 12/1992 | Wilson |
| 5,685,591 A | 11/1997 | Simplicean et al. |
| 5,939,682 A | 8/1999 | Hartmann |
| 5,964,491 A * | 10/1999 | Marsh ..................... B60R 5/044 224/275 |
| 6,183,030 B1 | 2/2001 | Stender et al. |
| 6,258,438 B1 | 7/2001 | Loveland et al. |
| 6,713,150 B2 | 3/2004 | Alts et al. |
| 6,808,228 B1 * | 10/2004 | Campbell ............ B62D 25/087 296/187.11 |
| 7,032,947 B2 | 4/2006 | Queveau et al. |
| 7,077,455 B2 | 7/2006 | Guillez et al. |
| 7,093,885 B2 | 8/2006 | Guillez et al. |
| 7,594,685 B2 | 9/2009 | Brockhoff |
| 7,628,446 B2 | 12/2009 | Harney et al. |
| 8,172,296 B2 | 5/2012 | Umeda et al. |
| 8,403,399 B2 | 3/2013 | Kuntze et al. |
| 8,628,133 B2 | 1/2014 | Honda et al. |
| 8,991,900 B2 * | 3/2015 | Yamaji ................. B62D 25/025 296/181.2 |
| 9,701,250 B1 * | 7/2017 | Ranga ................. B60R 11/0223 |
| 9,840,202 B1 * | 12/2017 | Ranga ................. B60R 11/0223 |
| 9,902,337 B1 * | 2/2018 | Ranga ................. B60R 11/0217 |
| 2004/0007892 A1 | 1/2004 | Harata et al. |
| 2005/0016793 A1 * | 1/2005 | O'Regan ................... B32B 5/18 181/290 |
| 2005/0263461 A1 * | 12/2005 | Heim ...................... B60R 5/044 211/30 |
| 2006/0141240 A1 | 6/2006 | Ota et al. |
| 2006/0222841 A1 * | 10/2006 | Masumizu ........ B29C 45/14336 428/319.3 |
| 2007/0075568 A1 * | 4/2007 | Kim .................... B60R 11/0217 296/193.08 |
| 2007/0092690 A1 * | 4/2007 | Gocht ..................... B60R 13/02 428/100 |
| 2008/0169678 A1 * | 7/2008 | Ishida ................. B29C 49/2408 296/191 |
| 2009/0029102 A1 * | 1/2009 | McCulloch ......... B29C 44/1209 428/114 |
| 2009/0298374 A1 | 12/2009 | Deimas |
| 2010/0132559 A1 * | 6/2010 | Ishida .................. B01D 53/228 96/5 |
| 2010/0237648 A1 * | 9/2010 | Hofmann ................ B60R 5/044 296/37.16 |
| 2010/0255251 A1 * | 10/2010 | Le Roy ..................... B32B 5/26 428/119 |
| 2014/0050886 A1 * | 2/2014 | Burgin ..................... B32B 5/18 428/138 |
| 2014/0110963 A1 * | 4/2014 | Kuroda .................. B60R 5/044 296/39.3 |
| 2014/0127451 A1 * | 5/2014 | Pilpel ....................... B32B 5/12 428/113 |
| 2015/0174797 A1 * | 6/2015 | Toda ....................... B29C 51/12 442/394 |
| 2015/0283948 A1 * | 10/2015 | Oppliger ................. B60R 5/044 296/24.43 |
| 2015/0291103 A1 * | 10/2015 | Lopes ...................... B60R 5/044 296/37.8 |
| 2016/0236627 A1 * | 8/2016 | Kato .................... B60R 11/0217 |
| 2017/0088094 A1 * | 3/2017 | Hillman .............. B60R 11/0217 |
| 2017/0210306 A1 * | 7/2017 | Tavakoli Targhi .......................... B60R 13/0268 |
| 2017/0355316 A1 * | 12/2017 | Ranga ..................... B60R 5/044 |
| 2017/0369103 A1 * | 12/2017 | Khayat ................ B62D 25/087 |

FOREIGN PATENT DOCUMENTS

| | | |
|---|---|---|
| JP | 2003312370 A | 11/2003 |
| KR | 100603823 B1 | 7/2006 |
| WO | WO2014013634 A1 | 1/2014 |

OTHER PUBLICATIONS

EP Extended Search Report for EP Application No. 15831722.2 dated Mar. 9, 2018 (8 pages).

* cited by examiner

COMPOSITE MODULE

REFERENCE TO COPENDING APPLICATION

This application claims the benefit of U.S. Provisional Patent Application Ser. No. 62/036,401 filed Aug. 12, 2014, which is incorporated herein by reference in its entirety.

TECHNICAL FIELD

The present disclosure relates to a composite module for a vehicle, and, in particular, a composite module formed of a plurality of laminate layers.

BACKGROUND

Automotive interior modules, such as rear shelf assemblies (also known as desk assemblies) are generally known, see for example U.S. Pat. No. 5,171,054; U.S. Pat. No. 5,685,591; U.S. Pat. No. 7,032,947; U.S. Pat. No. 7,628,446; U.S. Pat. No. 8,628,133; U.S. Pat. No. 8,403,399; U.S. Pat. No. 5,939,682; U.S. Pat. No. 6,713,150; U.S. Pat. No. 4,728,141; U.S. Pat. No. 6,183,030; U.S. Pat. No. 7,093,885; U.S. Pat. No. 7,077,455; U.S. Pat. No. 4,634,174; U.S. Pat. No. 4,277,097; U.S. Pat. No. 7,594,685; U.S. Pat. No. 8,172,296; and U.S. Pat. No. 6,258,438.

Automotive interior modules typically include one or more metal stampings, and a cover of finishing material such as cloth, carpeting, or vinyl, and may house components. For example, rear shelf modules or assemblies may include speakers and subwoofers. The multiple metal members of such modules are typically spot welded together, and the process of assembling such a module is both time and labor intensive. Additionally, such rear shelf modules conduct sound, which is detrimental to the acoustics of the vehicle passenger compartment.

What is needed is a lighter weight alternative and/or alternatively a system that enhances modularity through component integration to reduce part numbers and assembly line manufacturing costs, can dampen sound, and improve acoustics. In certain embodiments, a weight reduction of 40% over a conventional metal rear shelf module is targeted.

It may be desirable in at least some applications to provide an automotive interior module that reduces or overcomes some or all of the difficulties inherent in prior known modules. Particular objects and advantages will be apparent to those skilled in the art, that is, those who are knowledgeable or experienced in this field of technology, in view of the following disclosure of the invention and detailed description of certain embodiments.

SUMMARY

A composite module for a vehicle is disclosed that may be both a structural member and also include a finished surface. In a particular embodiment there is provided a composite rear shelf module including a panel with a reinforced multilayer, multi-laminate fiber reinforced plastic composite structure. The panel may include selectively orientated, continuous fiber reinforced thermoplastic composite layers. The panel may also include discontinuous fiber reinforced thermoplastic reinforcements. The composite rear shelf module may include a show surface film with a class-A surface, eliminating the need for a separate layer of carpet or other material. In another embodiment the module has vehicle attachment members for securing the module to the vehicle body. In a particular embodiment the panel has a stiffness and a mass, and the stiffness, the mass, and the arrangement of the vehicle attachment members are tuned to move the natural modes, or natural frequencies, of the panel outside the working frequency range of any speakers or subwoofers attached to the rear shelf module to avoid undesired resonance within the working frequency of the speakers. In some embodiments, various thicknesses, foam sandwich structures, and ribbing may be utilized to "tune" the natural frequencies of the motor vehicle part. (e.g., shelf) to be outside an excitation range of components on the shelf (e.g., speakers). In this manner, the noise, vibration, and harshness (NVH) rating of the vehicle may be reduced. A composite panel constructed in accordance herein may substantially reduce the noise from internal components (e.g., speakers) and from the trunk area with respect to the cabin noise levels in the vehicle. Additionally, the rear shelf may be made stiff in the areas where required and thinner in other areas to reduce the overall weight while still meeting other design criteria.

In at least some implementations of a rear shelf assembly there is provided an integrated, composite rear shelf module including a light module with a center high mounted stop lamp ("CHMSL"). The may be coupled to a trunk light. In at least some implementations of the rear shelf module includes integrated trunk cargo hooks. For example, components and items in the trunk area and in the cabin area may be molded into the shelf without requiring other pieces or components.

A composite module for a vehicle as disclosed herein can provide one or more of structural strength, torsional rigidity, reduced noise, vibration, and harshness, reduced weight, and/or reduced time and labor required to assemble the vehicle.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Various different examples and embodiments of the inventive subject matter disclosed here are possible and will be apparent to the person of ordinary skill in the art, given the benefit of this disclosure. In this disclosure reference to "some embodiments," "certain embodiments," "certain exemplary embodiments," "implementations" and similar phrases each means that those embodiments or implementations are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments.

A reference to a component being operative or configured to perform one or more specified functions, tasks, and/or operations or the like, is intended to mean that it can but does not necessarily have to perform such function(s), task(s), and/or operation(s) in at least certain embodiments, and may well be able to perform one or more other functions, tasks, and/or operations. While this disclosure mentions specific examples and embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited in the claim. The phrase "consisting essentially of" is used to signal that the product or process defined necessarily includes the listed components and is open to unlisted components that do not materially affect the basic and novel properties of the invention.

As used here and in the accompanying claims, directional terms used in describing the composite modules disclosed here should be understood to have their ordinary meaning with reference to gravity, including, e.g., up, down, over, under, etc. Accordingly, for example, an up-down direction is vertical as that term is commonly used. It should be further understood, however, that directional or positional references to portions of a composite module disclosed here refer to the orientation of the composite module in ordinary use as it is installed in an automobile or other vehicle. Thus, the underside of a composite module is the side normally acing down when the composite module is positioned within an automobile or other vehicle in its intended or ordinary configuration during use.

Embodiments of a composite module for a vehicle include a panel formed from a plurality of laminates. The composite module may have a structure with multiple, multi-layer composite laminates that are selectively continuous fiber or chopped fiber reinforced thermoplastic or thermoset; and short fiber or long fiber composite over-molding reinforcements. The composite module can be shaped to any desired vehicle body, and may connect the left and right sides of the vehicle. The multiple, multi-layer composite laminates can be laid over one another to form a single piece. Alternatively, the multiple multi-layer composite laminates can be formed separately and consolidated together to form a clam shell. The multiple composite laminate can be formed by consolidating multiple layers together. Multiple laminates can be combined (such as shell structure) together by various techniques including but not limited to friction welding, laser welding, mechanical inter-locking, and injection molding. Attachments such as brackets may be added to the laminate or module for attachment to a vehicle. The module may be attached to a vehicle by any suitable method including mechanical fasteners or welding.

The composite module can provide one or more of the following: reduced noise, vibration, and harshness (NVH) with one or more of design shape, material stiffness and material variability as described within this disclosure.

In various embodiments of the design, the multi-layer composite laminate may be curved rather than being planar. The curvature of the design may increase the stiffness of the composite module. The increased stiffness in the composite module can be used to reduce NVH. For example, the curvature may be in the horizontal and/or vertical direction.

Figure 1:
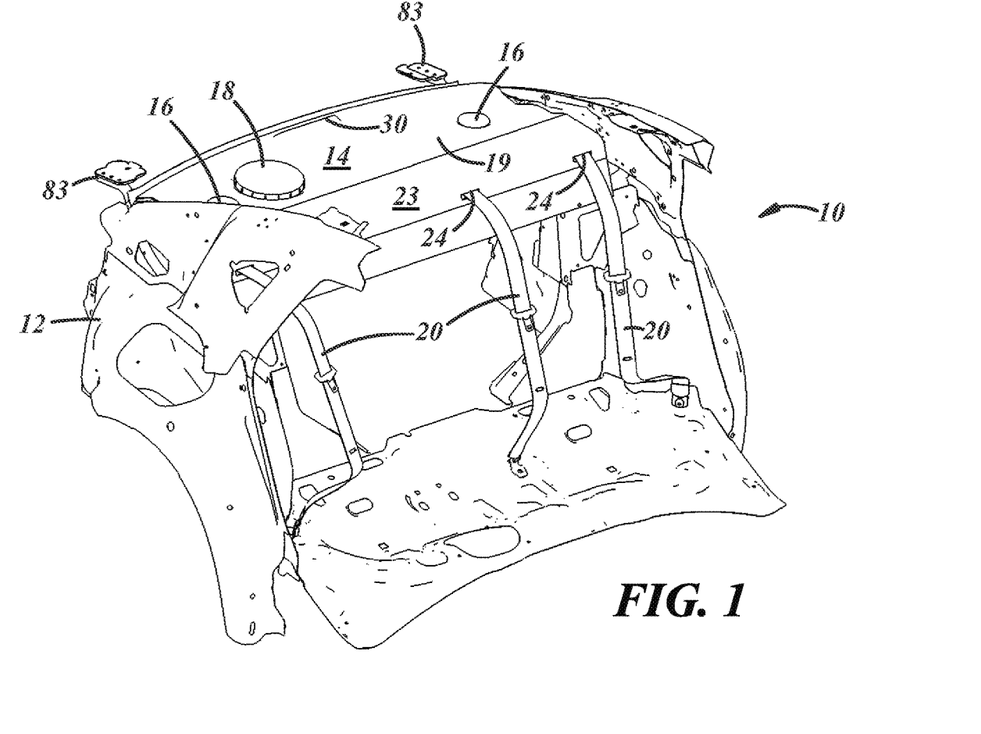
FIG. 1 shows a perspective view of a composite rear shelf module installed in a vehicle (shown in part)
Figure 2:
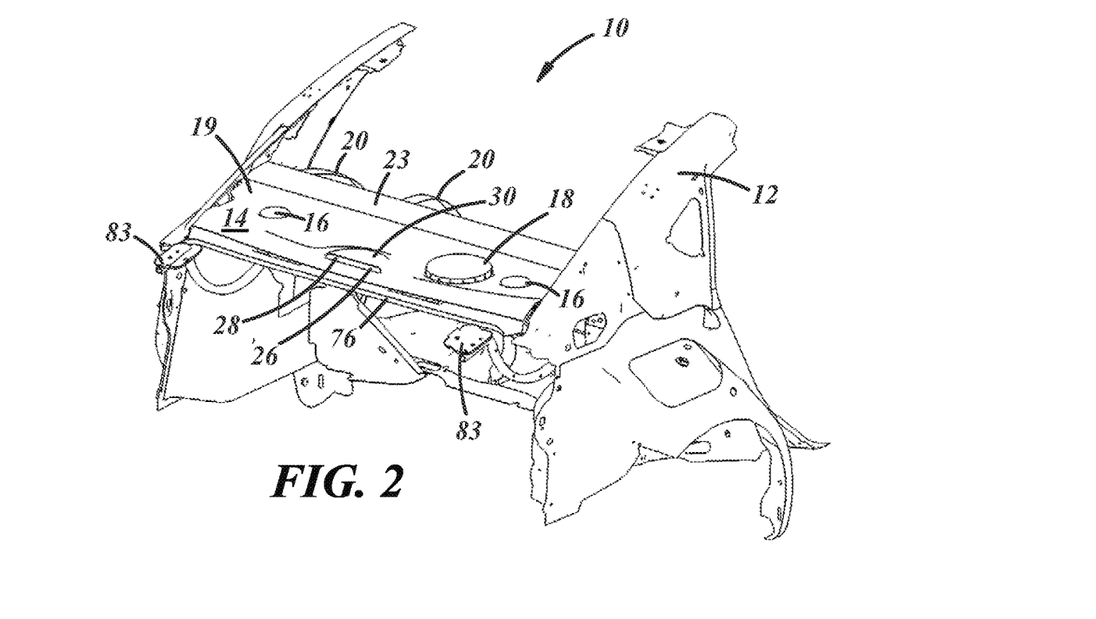
FIG. 2 shows a perspective view of a composite rear shelf module installed a vehicle (shown in part)
Figure 3:
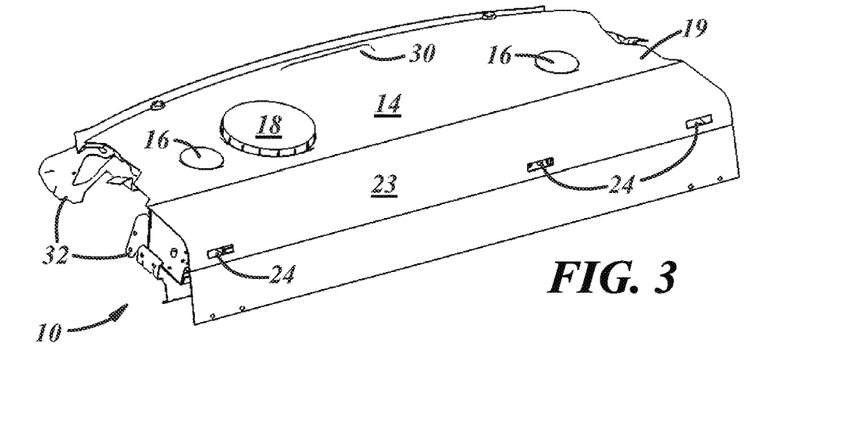
FIG. 3 shows a top side perspective view of a composite rear shelf module.

An illustrative embodiment of a composite module 10 is shown in FIGS. 1 and 2. In this embodiment, the composite module is a rear shelf module 10. It is to be appreciated that composite modules as described herein can be used in other portions of a vehicle such as a vehicle roof, a brace across the top of the vehicle, and/or a vehicle dashboard. Portions of the vehicle that provide structural strength and torsional rigidity and/or are exposed to an interior of the vehicle passenger compartment can be provided with a composite module as described herein.

Rear shelf module 10 may be configured to be located, for example, in the vehicle between the rear seats and the trunk space within the frame 12 of the vehicle. As described in greater detail below, in a particular embodiment, the rear shelf module 10 may be multi-layer, polymer composite laminate panel 14 formed of selectively continuous fiber, chopped fiber reinforced thermoplastic, and/or thermoset, and may be supplemented with short fiber or long fiber composite over-molding reinforcements.

In the embodiment illustrated in FIGS. 1-7, rear shelf module 10 may include speakers 16 and/or a subwoofer 18, each of which is received in an aperture 17 such as a cut-out (seen in FIG. 8) formed in an upper surface 19 of panel 14. A plurality of seat belts 20 with corresponding housings or retractors (not visible in FIG. 1) may be coupled to or carried by rear shelf module 10. In the illustrated embodiment, there may be three seat belts 20 and three corresponding retractors, which may be positioned on the upper surface of panel 14, for example, within a channel 22 beneath a cover panel 23. The channel 22 may alternately serve as a storage compartment for including longer items such as a fishing pole, or umbrella. Seat belts 20 may be configured to extend through slots or apertures 24 formed, for example, in cover panel 23.

Rear shelf module 10 may be configured to serve as a structural element of the vehicle. In these embodiments, rear shelf module 10 may be configured to have sufficient strength to provide anchoring support for elements which may be attached thereto, such as seat belt retractors, seatback latches, and/or child seat tether anchors. In these embodiments, rear shelf module 10, may be subject to multiple loads in various directions and force vectors. For example, it may have torsional loads as the vehicle is cornering, impact loads on seat back latches, child seat tether anchors, and/or retractors in the event of an accident, vibration loads from speakers, and rear loads from ear end collisions, and/or traverse loads from side impact collisions in an area proximate to shoulder height of a seated passenger. The stiffness, strength, and torsional rigidity of the rear shelf module may be reinforced in the areas of greatest stress using techniques described herein. For example, as explained in more detail herein, additional layers and/or fibers may be added in areas of the collision loads such as where the seat back latches, child seat tether anchors, and/or retractors are fixed. Further, reinforcing ribs may be added in other areas such as where subwoofers are located and/or where the rear shelf may vibrate from music from the subwoofers. Further, form cores or shoddy may be added to dampen noises from outside the cabin such in the trunk area in order to reduce noise conducted through the shelf structure.

Rear shelf module 10 may include a rearwardly facing center high mounted stop tamp (CHMSL) 26. In the illustrated embodiment, CHMSL 26 projects outwardly through a light aperture 28 formed in panel 14. In certain embodiments, panel 14 includes a raised portion 30, with light aperture 28 formed in a rear-facing surface of raised portion 30. Light from the CHMSL may be directed rearward and/or have additional lighting elements (e.g., LEDs) with light directed in other directions such as in the trunk to function as a trunk light and/or into the cabin to function as a map/reading light. For example, the CHMSL may have a proximity sensor for detecting when the trunk lid is opened and hence operate a light shining downward through the rear panel (via an aperture and/or clear lens) into the trunk area. The CHMSL may also include reading lights and/or reading light switches for activating and projecting light into the rear passenger compartment. In this manner numerous parts may be consolidated into a single module including one or more of the trunk switch, the trunk light, the CHMSL and the rear reading lights.

Figure 4:
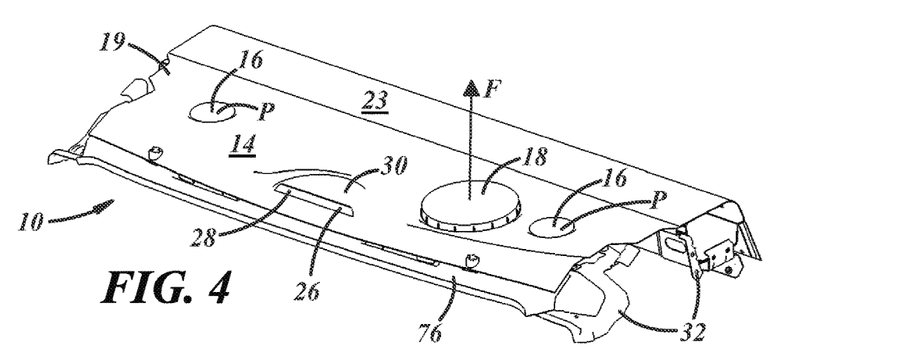
FIG. 4 shows a top side perspective view of a composite rear shelf module.

As seen in FIG. 4, rear shelf module 10 may include attachment brackets 32 that may be used to attach rear shelf module 10 to frame 12. In certain embodiments, attachment brackets 32 may be separate elements which may be secured to panel 14. Attachment brackets 32 may be formed of any suitable material, including composite materials and/or metals such as steel or aluminum. Other suitable materials for attachment brackets 32 will become readily apparent to those skilled in the art, given the benefit of this disclosure. In other embodiments, attachment brackets 32 may be of unitary (e.g., integrated one-piece) construction with panel 14. For example, the brackets 32 may be integrally molded into rear shelf module 10, as additional features in the same piece of material.

Figure 5:
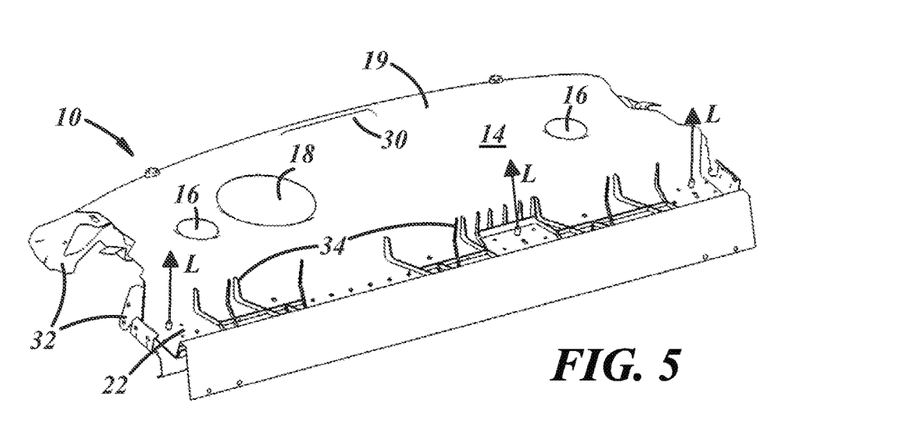
FIG. 5 shows a top side interior cut away perspective view of a composite rear shelf module with reinforcements.

As seen in FIG. 5, a plurality of front reinforcing members 34 may be secured to any suitable portion of rear shelf module 10 such as upper surface 19 of panel 14. As illustrated in this example, front reinforcing members 34 may be positioned within channel 21. In certain embodiments, front reinforcing members 34 may be positioned to provide additional strength and stiffness in areas where the seat belt retractors are anchored to panel 14. The use of the channel 21 together with the reinforcing members 34 may be configured to allow the channel to be open. An open channel (e.g., three sided channel) may provide for a simple molding process without the need to pass the part through the mold multiple times. Further, an open channel allows for the rear shelf to have a storage compartment that spans the length of the rear sear allowing for longer items such as ice scrapers, umbrellas, and fishing poles to be securely stored. As described in greater detail below, front reinforcing members 34 may be short fiber or long fiber composite over-molding reinforcements formed by injection molding.

In certain embodiments, panel 14 may have a curved surface rather than being planar. Such a curved surface can improve the strength and rigidity of panel 14. In a particular embodiment the curvature of panel 14 is concave as viewed looking down on the upper surface of the panel. Further, in certain embodiments, panel 14 is concave in the area around speakers 16 and subwoofer 18. Selected curvature of the rear panel allows for added bending and torsional stiffness and improves NVH in areas of greatest need such as the areas of the subwoofers.

Figure 6:
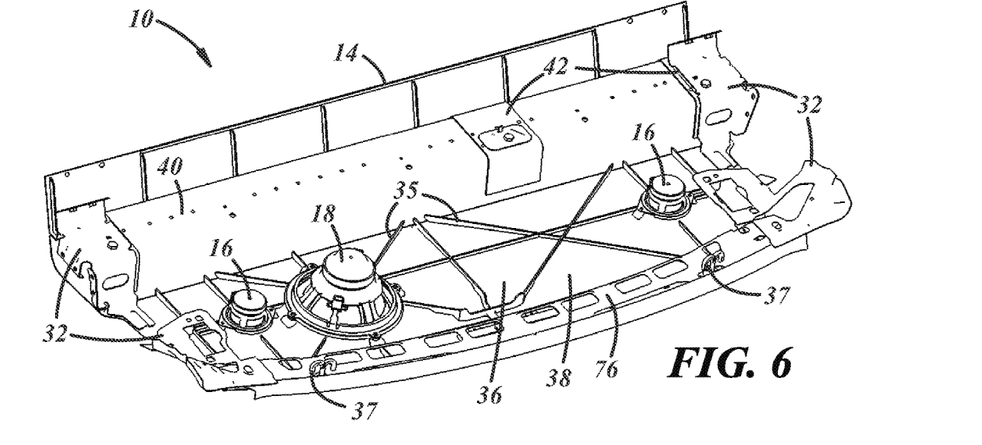
FIG. 6 shows a bottom side exterior perspective view of a composite rear shelf module.
Figure 7:
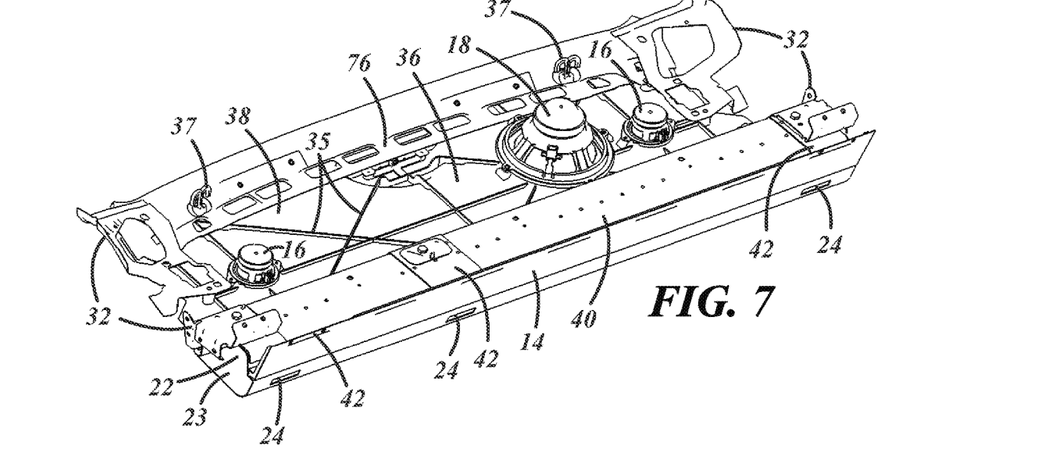
FIG. 7 shows a bottom side interior perspective view of a composite rear shelf module.

As seen in FIGS. 6-7, a plurality of rear reinforcing members 35 may be secured to a bottom or lower surface 36 of panel 14. As illustrated here, rear reinforcing members 35 may provide additional strength and stiffness in the area of speakers 16 and/or subwoofer(s) 18, to counteract the vibrations produced when speakers 16 and/or subwoofer(s) 18 are operating. Rear reinforcing members 35 can have any desired shape and/or orientation. In the illustrated embodiment, rear reinforcing members 35 may be elongate members extending at angles with respect to one another to form cross members. Rear reinforcing members 35 may be provided at select locations on lower surface 36 to counteract the vibrations of speakers 16 and/or subwoofer 18, as well as to provide additional strength at select locations, such as where seatbelt retractors are located. Additional rear reinforcing members 35 can be provided as needed at any other desired locations. As described in greater detail below, rear reinforcing members 35 may be short fiber and/or long fiber composite over-molding reinforcements formed by, for example, injection molding.

Subwoofer 18, in this embodiment, may be located off-center to reduce, for example, vibrations in panel 14. It is to be appreciated that one or more subwoofer(s) 18 could be located in the center of panel 14, and that additional reinforcing members may be included to support such an alternate location of subwoofer(s) 18. Additional reinforcing members may increase the stiffness of panel 14. In some embodiments, the reinforcing members may also increase weight. Further, foam sandwich structures may also be added in the areas of expected vibrations in order to dampen vibrations and improve overall NVH and improve acoustics quality. In addition to speaker(s) 16, subwoofer(s) 18, seat belt retractors and CHMSL 26 discussed above, rear shelf module 10 may include one or more of the following: structural components, reinforcements, seat belt retractors, seat back latches, child seat tether anchorages, lighting, and/or other electrical/mechanical mechanisms/attachments. For example, as seen in FIGS. 6-7, cargo hooks 37 may be positioned on the lower surface 36 of panel 14. For example, these cargo hooks 37 may be utilized within the trunk of the vehicle. Cargo hooks 37 or cargo hook mounts may be over molded onto panel 14, to reduce component count as described in greater detail below.

The composite rear shelf provides sufficient structural support to meet design requirements. The additional components may be coupled to rear shelf module 10 by mechanical attachment by any desirable technique including such things as fastener(s), adhesives, mechanical mechanisms that tap into the over-molded mounting features, nuts, stud bolts, and/or over molding.

Figure 8:
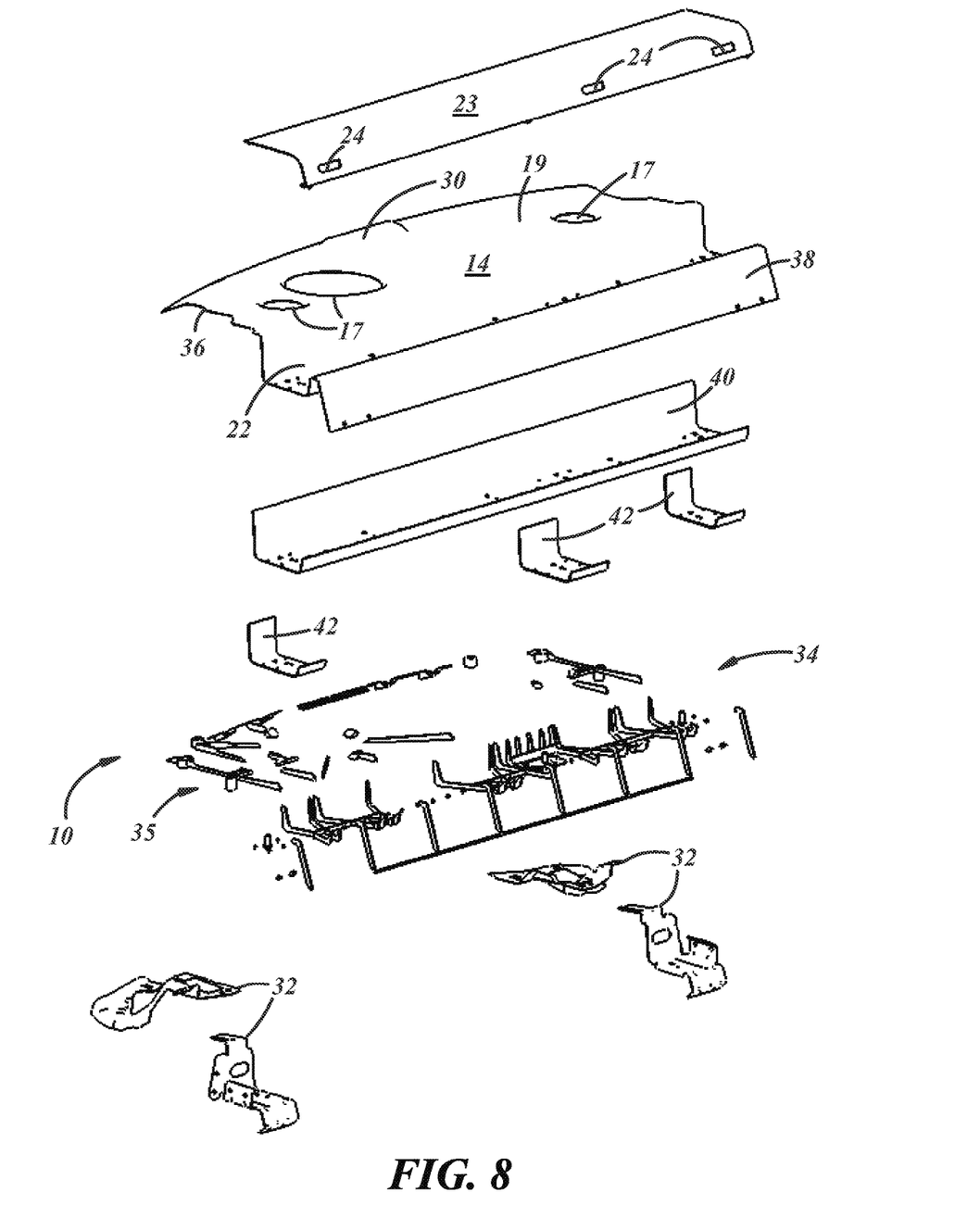
FIG. 8 shows an exploded view of a composite rear shelf module.

The rear shelf module 10 may be variously configured. For example, the rear shelf module may comprise a plurality of layers and components. One example is illustrated in FIG. 8. In this embodiment, Panel 14 may be formed of a plurality of laminates, each laminate may be formed of a plurality of layers of continuous fiber reinforced thermoplastic/or thermoset (either of which is "CFRT"), and the various layers may be selectively oriented with respect to one another. The fibers may be continuous glass fibers impregnated in polyamide resin (or matrix), such as PA6 material. The nominal properties of the composite material may include one or more of the following at 23° C.: Density of 1.72 g/cm3 with a fiber content of wt. 60%. Other properties at nominal may be one or more of tensile modulus of 33 GPa; stress at break of 770 Mpa; strain at break of 2.4%; flexural modulus of 32 GPa; and/or flexural strength of 970 MPa.

It should be noted, that the requirements of the structural and NVH performance can be met by variation in the material of the composite laminates, over molded reinforcements, attachments, fiber orientations in each ply of the laminates, the sequence of the ply fiber orientations, material thickness, and/or any combination of over-molded reinforcements.

Each layer of panel 14 may be formed of a plurality of unidirectional fibers, with each layer oriented in a direction different than that of layers adjacent to it. The layers may be provided in tape form, with multiple tapes joined together to produce a laminate. An exemplary tape is Ultratape B3WG12 UD, provided by the BASF Corporation. The layers of each laminate may be variously configured such as approximately 0.25 mm in thickness+/−40%, or preferably +/−25%, or even more preferably +/−10% or most preferably 5% or less. Further, each laminate may be formed of any desired number of layers.

In contrast to a conventional sheet metal rear shelf panel, a composite rear shelf panel as disclosed herein may have a varied thickness, allowing additional material to be positioned where it is needed to reduce NVH, and provide additional strength and stiffness in particular areas, such as where seat belt retractors are located and/or in areas spaced from the subwoofers.

In the illustrated embodiment shown in FIG. 8, panel 14 may include a first laminate 38, which may itself include apertures 17 that receive speakers 16, and subwoofer(s) 18. First laminate 38 may be formed of a first layer of CFRT oriented in a first direction, considered to be the zero degree, or zero direction; a second layer of CFRT is oriented perpendicular to the first layer (in the 90 direction); a third layer of CFRT is oriented perpendicular to the second layer (in the 0 direction); and/or a fourth layer of CFRT is oriented perpendicular to the third layer (in the 90 direction). Thus, in examples where each layer is approximately 0.25 mm, the thickness of the first laminate 38 may be approximately 1 mm. The weight of this embodiment is approximately 3.342 lbs. A class A film may be positioned as an uppermost layer of laminate 38 in order to provide a finished surface for the interior of the vehicle compartment. Such a film can eliminate the need for a separate layer of carpet or other material on the uppermost surface of rear shelf module 10. Thus, a significant cost and weight element may be eliminated from the manufacturing process.

A second laminate 40 may be positioned near the front of the rear shelf module 10, for example, below first laminate 38. In one exemplary embodiment, it may be positioned below the area where channel 22 is formed. In this embodiment, the second laminate 40 may be variously configured to include one or more layers but in some embodiments includes about 5 layers. In the illustrated embodiment, second laminate 40 may include a first layer of CFRT oriented at 45° with respect to the 0 direction of the first laminate; a second layer of CFRT may be oriented perpendicular to the first layer, in the −45 direction; a third layer of MT may be oriented in the 0 direction; a fourth layer of CFRT may be oriented in the −45 direction; and/or a fifth layer may be oriented in the 45 direction. Thus, the thickness of second laminate 40 may be variously configured such as approximately 1.25 mm. As provided in this example the laminate may be configured to weigh about 1.485 lbs.

A third laminate 42 may also be desirable. Where a third laminate 42 is utilized, it may be positioned below second laminate 40. The third laminate 42 may include various numbers of layers such as about 9 layers in this embodiment. For example, layers of composite such as CFRT may be oriented in a suitable orientation such as 0/90/45/−45/0/−45/45/90/0. The thickness of third laminate 42 may be variously configured to be about 2.25 mm. As provided in this example, the laminate may be configured to weigh about 0.598 lbs.

In the illustrated embodiment, multiple third laminates 42 may be included below second laminate 40, and may be positioned within panel 14 so as to provide extra strength and support at the locations where seatbelt retractors may be attached. Where three seat belt retractors are used, three third laminates may be used, each corresponding to a different one of the seat belt retractors.

Also shown in FIG. 8 are the plurality of front reinforcing members 34 that are secured integrally to upper surface 19 of first laminate 38 of panel 14. These reinforcing members may be integrally molded to the rear shelf module 10 using chopped fibers and a resin to form an exemplary composite material molded integrally with rear shelf module 10. Additionally, a plurality of rear reinforcing members 35 may be secured integrally to lower surface 36 of first laminate 38 of panel 14, as well as attachment members 32. The reinforcing members 35 may be variously configured but in exemplary embodiments are chopped fibers and a resin to form an exemplary composite material molded integrally with rear shelf module 10. Front reinforcing members in the example shown here weigh about 0.376 lbs. and rear reinforcing members 35 in the example shown here weigh about 0.443 lbs. The reinforcing members 35 may be variously configured and arranged but in general may be disposed to reinforce the channel, to reinforce the areas where the passenger restraints are positioned, and to reinforce areas disposed around and in open areas spaced from the subwoofer.

Although the illustrated embodiment includes three laminates, it is to be appreciated that panel 14 can be formed of any number of laminates such as 2-6 laminates. Further, as seen here, each laminate layer may have any desired shape and size. The number of layers, and their size, shape, and location can be varied throughout panel 14. For example, additional layers may be located in areas such as that proximate to restraint assemblies, disposed in flat areas subject to subwoofer vibrations, and/or along the channel, thereby increasing the strength and rigidity, and reducing vibration in a desired location.

Figure 9:
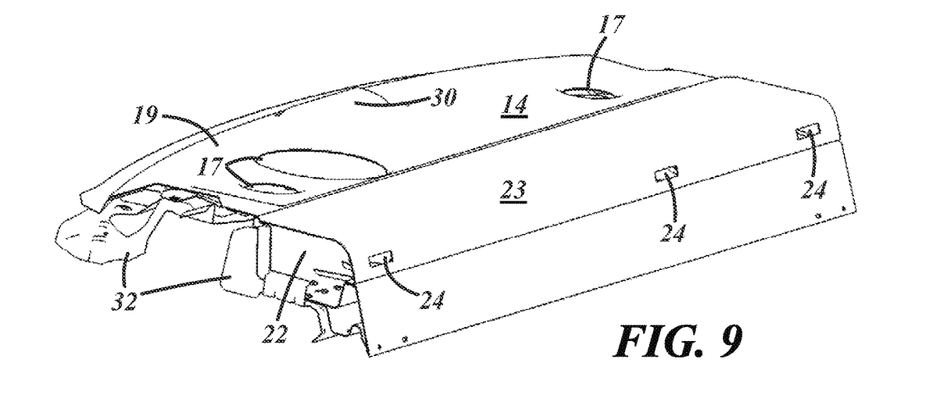
FIG. 9 shows an interior perspective view of a composite rear shelf module.

In an alternative embodiment, multiple, multi-layer composite laminates may be formed together in a clam shell along the length of the shelf. As seen in FIG. 9, a show surface 23 may be disposed over an open channel to form a storage compartment. This compartment may be hinged and lockable. Wiring such as a bus wire may be routed through this compartment for supplying power and control to CHMSL 26, trunk open detector, speakers, map lights, trunk lights, and/or other instrumentation. A protocol such as Controller Area Network (CAN), Local Interconnect Network (LIN), D2B, FlexRay, DC-BUS, IEBus, I$^2$C, ISO-9141, J1587, J1708, J1850, J1939, ISO 11783, LIN, MOST, and Vehicle area network may be used. Physically, exemplary embodiments of the bus may be a single wire, twisted pair, fiber optic, IEEE 1394, USB, Ethernet, wireless and/or other communication protocol.

For example, an i-pod, i-phone, android, smart phone, tablet, laptop, and/or other media connector may be integrated into the rear shelf module 10. In this manner, guests and kids sitting in the back of the car may plug their audio/visual device into the interface in the back seat and thus supply audio and/or video to systems in the car. These users may be allowed control of the various interfaces via a touch screen integrated into the rear seat assembly and/or in the dash board. A composite module positioned in another location in the vehicle could also house additional elements such as a television screen, additional speakers, and channels for carrying air or wiring harnesses or busses. In certain embodiments, a PCB could be positioned directly on or within a composite module, e.g., within a channel. Although a rear shelf module 10 is described herein, the same description equally applies to a dash board or a crush protector or accessory panel along the roof line. The accessory panel can extend along the roof from one side of the vehicle to the other and may attach to the body structures of both sides of a vehicle.

Additionally, they may be able to download an application onto their portable device (e.g., smartphone) which enables them to control the audio/visual switching to speakers and/or video screens available in the rear compartment of the vehicle.

In one exemplary embodiment, the rear shelf module 10 has a modulus of expansion allowing for a CAN bus to be disposed (e.g., using chemical vapor deposition) and etched directly onto the rear shelf module 10. Additionally, electronic control units (ECU) may be disposed on the rear shelf (for example, in the areas of the CHMSL 26) to control various lighting and/or electronics, monitor seat belt and/or restraint connections and manage entertainment. The rear shelf may supply power, data, and other connections and provide a physical location to secure (e.g., snap fit) appropriate ECU modules.

Figure 10:
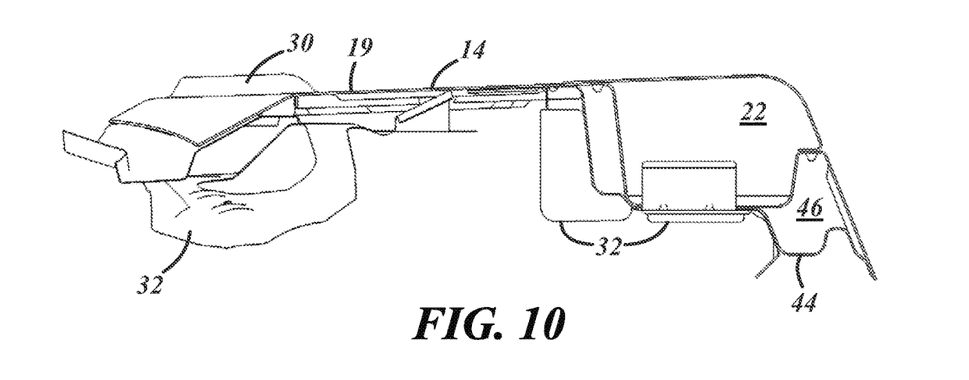
FIG. 10 shows a sectional view taken along the line 10-10 of FIG. 9 looking in the direction of the arrows showing a closed profile.

Referring to FIG. 10, panel 14 and cover 23 may be integrally formed clam shell arrangement, providing a closed profile cross-car wise. An additional panel member 44 can be provided beneath a front end of panel 14, thereby forming a channel 46 within another clam shell and closed profile. It is to be appreciated that in alternative embodiments, panel 14 of rear shelf module 10 can provide for no clam shells, or any plurality of clam shell sections as necessary to meet the structural requirements of torsional and bending rigidity. Providing additional elements to produce clamshell configurations and a closed profile can add stiffness to rear shelf module 10, however, the additional members add steps to the manufacturing process.

An open profile assembly provides for improved manufacturability. The closed clamshell, however, allows for greater strength to weight ratios.

Figure 11:
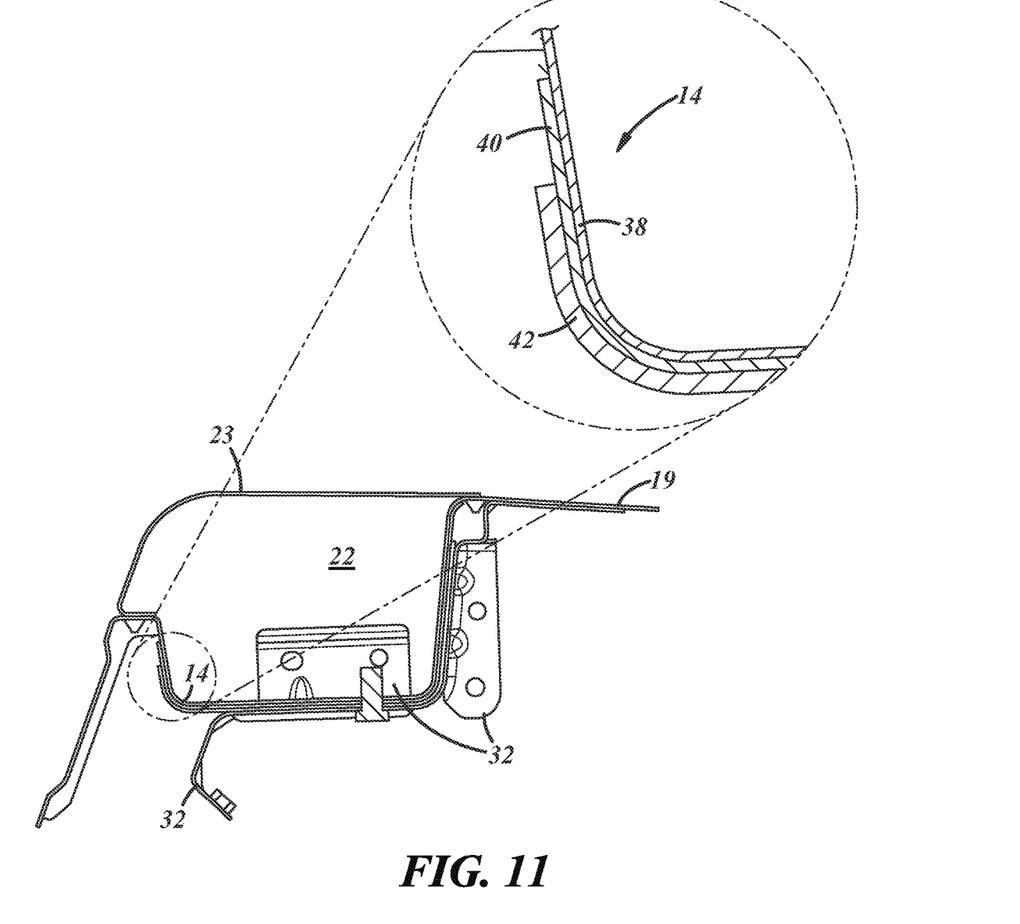
FIG. 11 shows cross sectional view of another embodiment of a composite rear shelf module, with a section expanded exemplifying a multiple, multilayer laminates.
Figure 12:
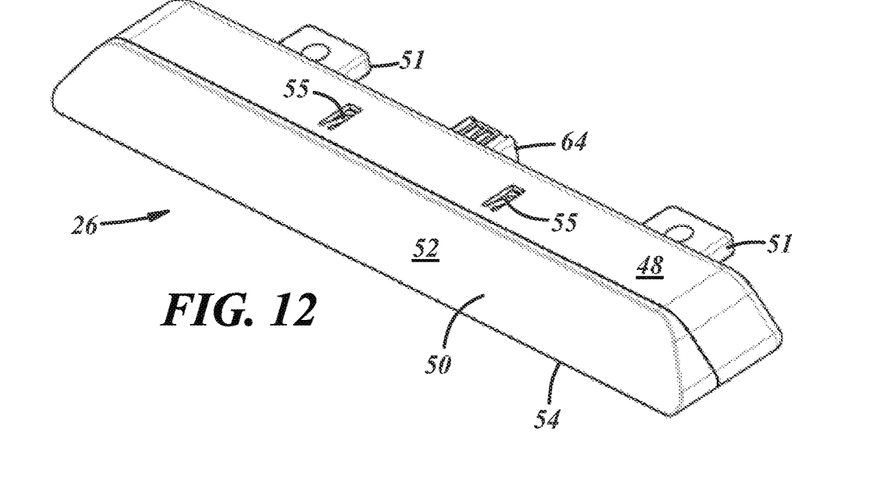
FIG. 12 shows a vehicle lighting system module that integrates the CHMSL with the trunk light into a single housing.
Figure 13:
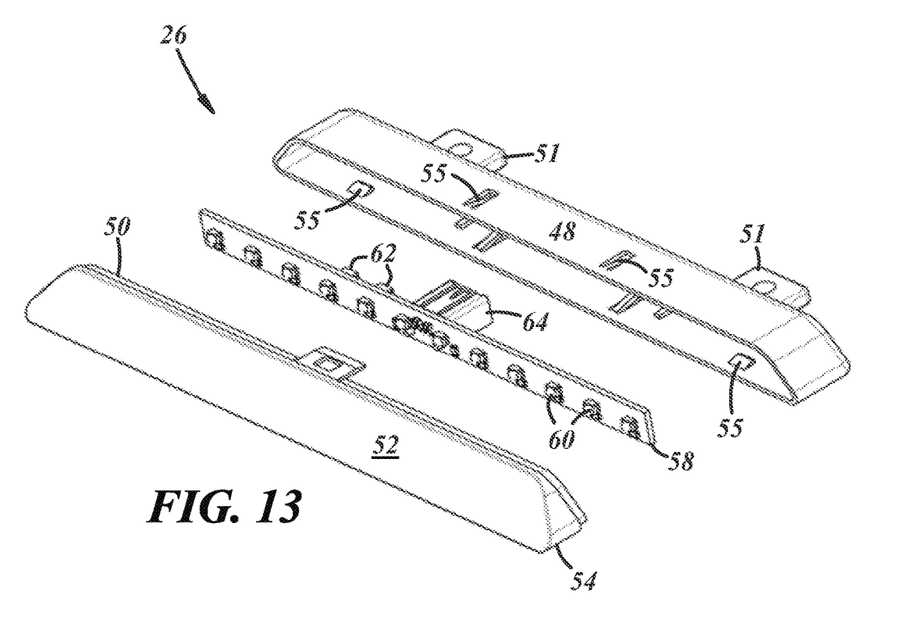
FIG. 13 shows an exploded view of a lighting system.

As shown in FIG. 11, by combining first, second, and third laminates, 38, 40, 42, in the higher stress corner regions transverse to the length of the car, the thickness and, therefore, the strength and rigidity of panel 14 can be increased in desired locations reduce and/or eliminate an integral clam shell. As illustrated here, by providing three laminates, the strength and rigidity of panel 14 is enhanced in the area where seat belt retractors are located.

Figure 14:
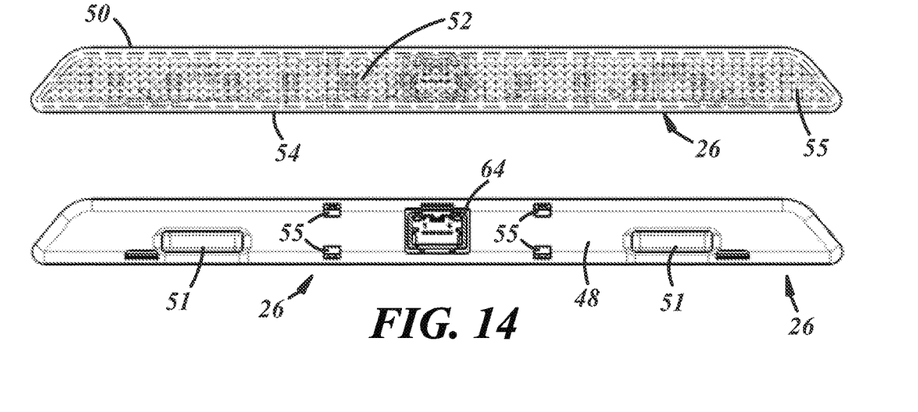
FIG. 14 shows a CHMSL and trunk lens combination.

As seen in FIGS. 12-15, CHMSL 26 may be variously configured to include, for example, a housing 48, a lens 50, and/or mounting brackets 51 for securing CHMSL 26 to rear shelf module 10. In the illustrated embodiment, lens 50 may be formed of plastic and may include a first portion 52 facing rearwardly and/or a second portion 54 facing downwardly and into the trunk space. First portion 52 may be configured to include a red tint to provide braking lights for CHMSL 26 (e.g., a red LED and/or a white LED with a red tinted lens, while second portion 54 may include white light (e.g., a white LED and/or a transparent or milky white lens) to provide illumination with the trunk space when it is opened. Lens 50 may be UV stabilized polycarbonate, and/or any other equivalent plastic. In certain embodiments, an interior surface of lens 50 may have an embossed pyramid pattern 55, as seen in FIG. 14, in order to diffuse light evenly throughout lens 50. Lens 50 may also include a Fresnel lens to focus light from the LED into the area of need. Lens 50 may be variously configured such as a snap fit arrangement to position the lens 50 within housing 48 by way of snap-fit fasteners 55 provided within housing 48, thereby eliminating the need for a separate fastener.

Figure 15:
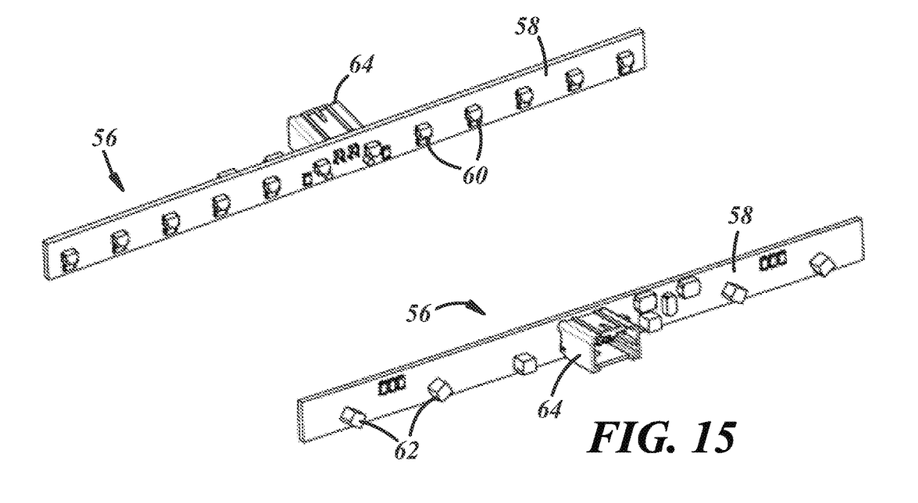
FIG. 15 shows a PCB from the side that faces the CHSML lens and the side that faces the trunk lens.

An LED assembly 56 may be contained within housing 48 and may be configured to provide light for CHMSL 26. As seen in FIG. 15, LED assembly 56 may be variously configured to include, for example, a double-sided printed circuit board ("PCB") 58, one or more (e.g., a plurality) of stop light LEDs 60 on a one surface (e.g., the front surface) of PCB 58, a plurality of trunk light LEDs 62 on another surface (e.g., a rear surface) of PCB 58, and one or more connector(s) 64 extending from PCB 58 (e.g., extending rearwardly) for connection with the stop light and trunk light wiring harnesses, bus, and/or wiring (not shown).

Stop light LEDs 60 may be red LEDs and may have vertical emission so as to project their light rearwardly through tens first portion 52 (e.g., red lens), providing, for example, a brake light. Trunk light LEDs 62 may be bright white or milky white LEDs, and may have right angled emission so as to project downwardly through transparent/milky white lens second portion 54, providing, in this example, illumination within the trunk space. Other similar arrangements may include white LEDs shining through the back of the CHMSL 26 to provide map lighting and/or portable device connectors such as fire wire, USB, and/or other smart phone/table connectors providing charging and integration with the cars audio/visual, phone antennas, and/or Internet connections. It is to be appreciated that trunk light LEDs and/or map/reading light LEDs 62 may be angled in any direction. For example, LEDs on PCB 58 could be directed into the passenger compartment to provide illumination for reading, and/or to provide mood lighting. Such LEDs could have a desired color or color combination. For example, the controller may be programmed to have the LEDs change colors responsive to the beat of the music. This feature could be enabled while only in park or stopped and/or may be provided at other times at different illumination levels. For example, if the driver is moving at high speeds and/or in low light conditions, the illumination levels may be reduced whereas if the driver is moving at lower speeds in bright light, the illumination levels of the LEDs and/or instrument panels may be increased. The auxiliary lighting may be enable/disabled under driver control and/or under rear passenger control via a suitable application.

Providing the CHMSL, rear cameras, blind spot cameras, turn signals, emergency flashers, trunk open sensor, interior lighting, and/or trunk lighting in one module along the rear shelf may eliminate the need for additional housings and/or an additional electronic control modules, thereby reducing weight, simplifying the assembly process, and reducing costs.

The embodiment illustrated herein depicts a rear shelf module with apertures for housing speakers and a CHMSL. It is to be appreciated that other elements could be incorporated in a rear shelf module, including, for example, additional lights such as reading lights, one or more cameras, air flow channels for rear window defrosting, power connections for rear window defrosting.

Figure 16:
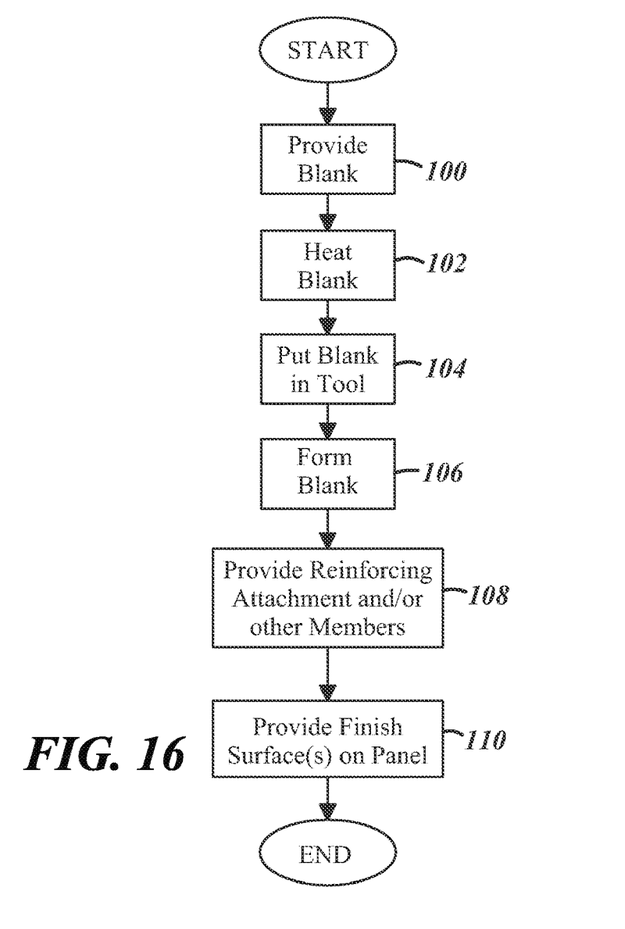
FIG. 16 is a flow chart of the steps used to form the panel of a composite rear shelf module.
Figure 17:
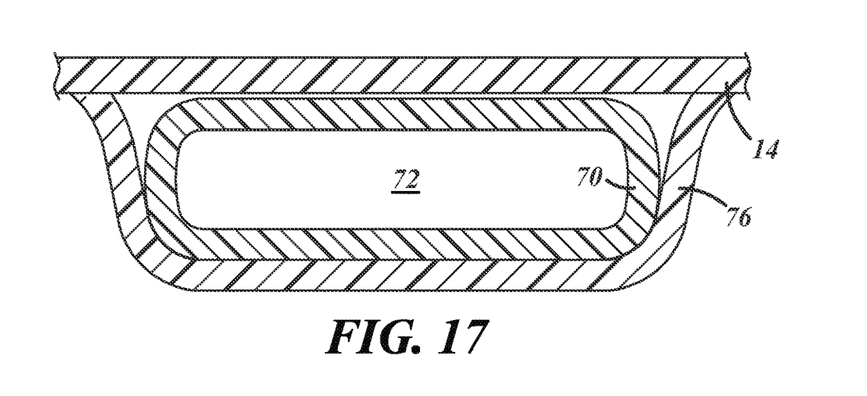
FIG. 17 is a cross-section, partially broken away, of the panel of a composite rear shelf module, shown with a conduit attached to the panel by overmolding.
Figure 18A:
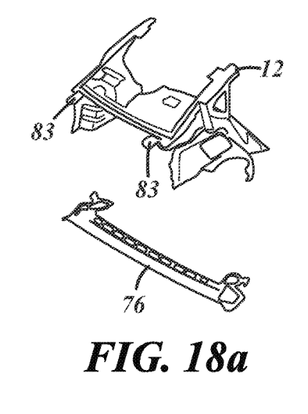
FIGS. 18a-18e are schematic illustrations of the installation of a composite rear shelf module in a vehicle frame.
Figure 18B:
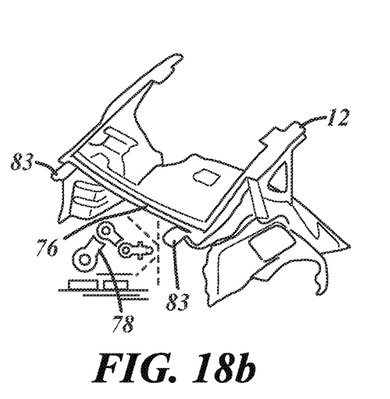
Figure 18C:
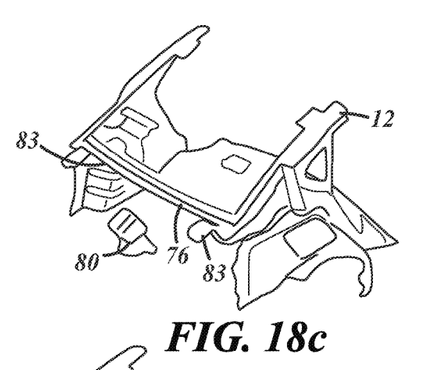
Figure 18D:
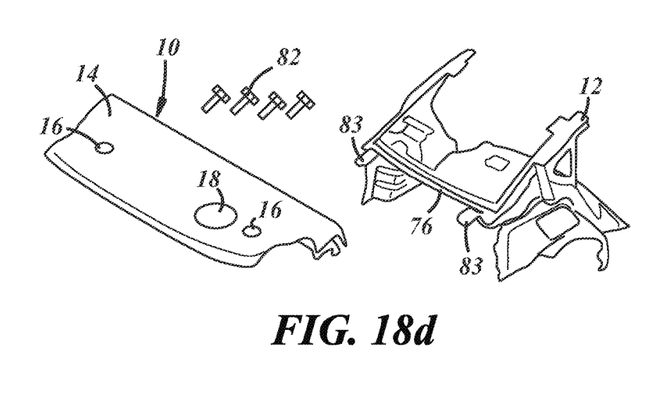
Figure 18E:
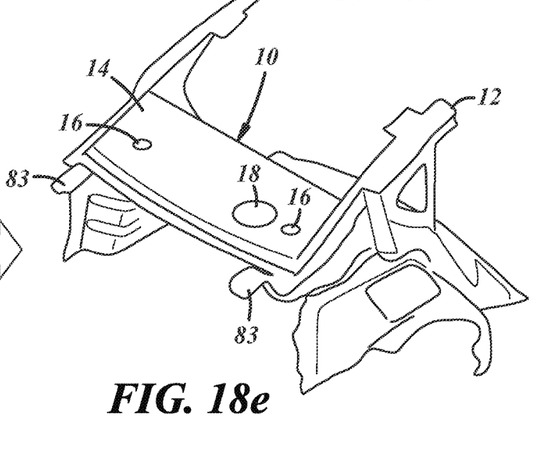

An example process or method for formation of panel 14 is described below with reference to FIG. 16. The plurality of laminates that may form panel 14 (e.g., laminates 38, 40, and 42 in this embodiment) may be assembled together in any suitable fashion. In an embodiment which eases manufacturing, the laminates are assembled as a blank at step 100. It is to be appreciated that the blank can be produced and assembled by a material supplier remote from the vehicle assembly location. The blank, which is considered to be at a first temperature state (e.g., relatively cold), may then be heated, such as by subjecting the blank to infrared heat in a pre-heat oven. The pre-heat oven may pre-heat blank to a point below its melting point, to soften the blank and make it malleable. The blank may then be positioned within a tool such as injection press. In a first step 106, the tool presses and/or stamps the blank into a desired shape under pressure, deforming or forming the blank. In another step 108, e.g., a second step, tool may overmold the front and rear reinforcing members 34, 35, as well as any other desired attachment members and/or additional elements, such as cargo hooks 37, onto the surface of panel 14, by way of injection molding. In the overmolding step, a combination of thermoplastic and short or long fibers are injected by the tool onto the surface of panel 14, creating a pattern based on a mold included in the tool, with the overmolded combination of thermoplastic and fibers setting as it cools. It is to be appreciated that any desired geometry of overmolded elements can be produced with the tool. Thus, in addition to front and rear reinforcing members 34, 35 and cargo hooks 37, a variety of other attachment members and/or anchors can be secured to panel 14. Anchors for elements such as CHMSL 26 can be created by overmolding. As noted above, seat back latches and child seat tether anchorage members can be installed by way of overmolding with the tool.

In further embodiments, the rear shelf assembly may be made by any suitable method. The composite rear shelf structure may be made with multiple, multi-layer composite laminates that are selectively continuous fiber or chopped fiber reinforced thermoplastic or thermoset and short fiber or long fiber composite over-molding reinforcements. The composite rear shelf can be shaped to fit any desired vehicle body. The multiple, multi-layer composite laminates can be laid over one another to form a single piece. Alternatively, the multiple multi-layer composite laminates can be formed separately and consolidated together to form a clam shell. The multiple composite laminate can be consolidated together by various techniques not limited to friction welding, laser welding, mechanical inter-locking, and injection molding. The composite rear shelf may also have a class A surface that can be, but is not limited to a film or additional layer of resin that is placed over the composite laminate blanks on the areas requiring class-A quality. The class-A material may be formed with the composite laminate. The forming process can form or punch any surface pattern into the material.

One way to make a rear shelf module includes consolidating composite layers into a first blank, and consolidating other composite layers into a second blank. For example, a first blank may be made by consolidating unidirectional composite layers into a base laminate. The second blank may be made by consolidating unidirectional composite layers into a structural laminate along with a consolidation of composite tape reinforcement layers. The two blanks can then be consolidated. The combined blanks are then IR heated. The heated blanks are placed into a mold and shaped. When the shaped blanks are combined in the tool, reinforcements may be over-molded onto the blank combination. Hardware may also be insert molded with the blank combination. As an additional measure a film may be over molded to the blank combination in which a class-A surface can be formed. The class A surface may be grained in the process. Vehicle attachments such as brackets may be over molded to the part. Alternatively vehicle attachments may be added to the module with adhesive. The module may then be sent for finishing including adding cutouts, hardware or for other additional procedures. The final product produced may be a clam shell or closed structure panel as shown in FIGS. 9 and 10 or an open structure panel as show in FIG. 8.

While the forms of the invention herein disclosed constitute presently preferred and several alternative embodiments, many others are possible, in that various parts described may be used independently or interchangeably with other parts described. As such this disclosure is not intended to mention all the possible equivalent forms or ramification of the invention. It is understood that the terms used herein are merely descriptive, rather than limiting, and that various changes may be made without departing from the spirit or scope of the invention.

Additionally, separate elements may be secured to panel 14 by way of overmolding, such as within a tool like an injection press. For example, as illustrated in FIG. 18, a conduit 70 defining a channel 72 therein can be secured to panel 14 with a resin layer 74 overmolded over conduit 70. Securing conduit 70 with channel 72 therein to panel 14 may provide a pathway for various elements such as a trunk release cable, wiring harnesses, busses for power, lighting, and/or any other desired electronic including audio/visual needs. Elements which may optionally be located within channel 72 can be inserted therein at any desired time.

Conduit 70 may be formed of any desired material, such as plastic, for example. It is to be appreciated that any other desired elements can be secured to panel 14 by way of overmolding. It is to be appreciated that rather than being physically inserted into channel 72, busses could be applied to panel 14 by chemical vapor deposition, allowing panel 14 itself to serve as a carrier for the busses.

In another step 110 (FIG. 16), the tool stamps the surface of the class A surfaces of panel 14, such as a class A film forming the uppermost layer of laminate 38 and an uppermost surface of cover 23. In certain embodiments, the cycle time to perform these three steps is between approximately 60 and approximately 70 seconds.

It is to be appreciated that in other methods, cover 23 may be formed in the same manner in a separate die within the same and/or a different tool. Panel 14 may be removed from the tool, and the finish trim steps may be performed, including buffering panel 14 and the overmolded elements attached thereto, trimming panel 14, including cutting apertures, such as apertures 17 for speakers, and/or then buffering the finished panel 14.

An exemplary installation of rear shelf module 10 in a vehicle is schematically illustrated in FIG. 19. A rear cross member 76, typically formed of metal may be spot welded by a robotic welder 78 onto frame 12. Paint may then be applied to frame 12 and cross member 76, which is schematically depicted by a brush 80. Rear shelf module 10 may then be attached above cross member 76 to frame 12 by way of fasteners 82, such as bolts. It is to be appreciated that the metal attachment brackets 32 (not shown here) as well as other metal members, such as the gooseneck hinges 83 used for the trunk deck lid, could in certain embodiments be formed of the same composite material as that of panel 14.

The use of a composite material for rear shelf module 10 and its various components results in a significant weight savings over a conventional metal rear shelf assembly. In one implementation, a subsystem of composite rear shelf module 10 and brackets 32 is approximately 46.3% less in weight than a conventional subsystem. The rear cross member 70 used to support composite rear shelf module 10 is approximately 20.6% less in weight than a cross member used to support a conventional metal rear shelf assembly. Additionally, the weight of the combined CHMSL/trunk light assembly and cargo hooks is approximately 77.7% less than the combination of a conventional CHMSL, trunk light assembly, and cargo hooks. The weight of the class A film used with panel 14 and the cover with a class A film weighs approximately 21.7% less than a conventional film/finish and cover. Thus, embodiments in accordance with the teachings herein have substantial advantages over conventional techniques and systems.

One of the advantages of the use of composite laminate material for rear shelf module 10 and/or its panel 14 can be in reducing NVH, and in particular, NVH created by speakers 16 and subwoofer 18. The vibration of speakers 16 and subwoofer 18 may create vibrations in panel 14. Speakers 16 and 18 typically operate in a range between approximately 40 Hz and approximately 60 Hz. Thus, it would be desirable that any natural frequencies of panel 40 exist outside of this range, that is, below approximately 40 Hz and above approximately 60 Hz, in order to reduce the chances of resonance of panel 14 due to operation of the speakers 16 and subwoofer 18. The configuration of panel 14 can be optimized to ensure that such natural frequencies or modes occur outside this range. That is, the thickness and arrangement of the layers forming the laminates that comprise panel 14 may be designed to help prevent resonance of panel 14 in the operating frequency range of 40 Hz to 60 Hz.

In general, to control the resonance, the mass and stiffness of the material may be varied, as well as the locations at which the material is supported. Thus, with a composite module as disclosed herein, such control of the resonance may be accomplished, in at least some embodiments, through the location of thicker laminate layers in certain areas, as well as the application of overmolded reinforcing members at certain locations. For example, bracing can be provided by overmolded reinforcing members at peak displacement areas for given excitation frequencies of subwoofer 18. Panel 14 may be tuned by altering the geometry of the laminate layers 14 in conjunction with the location of overmolded reinforcing members.

A mobility analysis of panel 14 while speakers 16 and subwoofer 18 are operating may be performed to assist in locating areas of greatest vibration or deflection. Overmolded reinforcing members may then be applied to those areas in order to increase the strength and/or rigidity of those portions of panel 14, and reduce the vibrations. It is to be appreciated that by altering the geometry of the laminate layers of panel 14, the need to overmold some reinforcing members may be reduced.

A mobility analysis of panel 14, with brackets 32 rigidly attached thereto by bolts may be performed, as schematically shown in FIG. 4, where an excitation force F is shown as being applied at the center of the subwoofer 18 location. This force F was scaled to provide a peak excitation (of 7 mm is in the frequency band tested during one example test). The speakers 16 were represented by point masses P at the geometric centers of their locations. The resultant contour plot displacement of panel 14 at approximately 40 Hz and at approximately 60 Hz were generated. This mobility analysis plot or map provided the points of maximum displacement at different frequencies, and this map may be used to confirm the optimal location for rear reinforcing members 35, which locations are seen in FIGS. 6 and 7.

In certain embodiments, sound could be isolated through the use of layers of sound absorbing material positioned on or captured within panel 14.

It may also be a goal to restrict the actual amount of travel of panel 14 where seat belt housings or retractors are located to a threshold of 3 mm/s, even while the speakers are played at full volume. The mobility analysis helps to determine whether the overmolded reinforcements applied to panel 14 are sufficient to meet this goal.

In one example test, the subwoofer 18 location was driven by a sinusoidal load of 1.79N to a driving velocity of approximately 7 mm/s, and the resultant velocity of the three seat belt housings or retractors, with the front and rear reinforcing members 34, 35 applied to panel 14. Since this is a linear analysis, the profile can be scaled to adjust the driving velocity to 7 mm/s. The response at each of the three seat belt retractors may be determined to ensure that it is at or below the threshold level (of 3 mm/s in this example) within the frequency band of 40 Hz to 60 Hz (or any desired band).

In order to determine whether panel 14 of rear shelf module 10 meets the requirements for seat belt pull, additional analysis can be conducted. In one example of this analysis, metal attachment brackets 32 were secured to panel 14 and held in place rigidly with bolts. As shown in FIG. 5, three loads L (12.8 kN in this example) were applied to panel 14 at the three locations where seat belt retractors are to be attached and a stress contour plot of the 12.8 kN loads applied at 80° C. was obtained. It is to be appreciated that the composite material used to form panel 14 loses strength and stiffness at elevated temperatures. A corresponding failure index plot at that temperature was determined. It is to be appreciated that the failure index is the ratio of the strain energy of the element to the strain energy to failure of the material. A failure index of 1 indicates material failure at that location. A stress contour plot of the 12.8 kN loads applied at 23° C. was also obtained, and a corresponding failure index plot at that temperature was determined. If a failure is indicated in this test, the panel may be reinforced, or the location of existing reinforcement may be changed as desired. Certain portions of the panel could also be made from thicker material, or the orientation of fibers or other components may be adjusted.

In addition to determining where the front and rear reinforcing members 34, 35 are to be located, the stress contour plots and failure index plots can be used to optimize the amount, size, configuration, and location of the particular laminates that form panel 14.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. For example, relative location or orientation terms like upper, lower, side, top, bottom, left, right or the like are directed to the orientation of components in the drawings and are not intended to limit the invention unless expressly noted as such a limitation. It is contemplated that the components may be oriented and arranged in other ways.

The invention claimed is:

1. A rear shelf module for a motor vehicle comprising: a multi-layer fiber reinforced composite material shelf panel; a vehicle attachment coupled with the shelf panel, and a short fiber reinforcement injection molded to the shelf panel.

2. The rear shelf module of claim 1 wherein the module has a stiffness and a mass, and wherein the stiffness, the mass and the vehicle attachment are tuned to move the natural modes of the panel outside the working frequency range of one or more panel located speakers.

3. The rear shelf module of claim 1, wherein the shelf panel includes a first laminate including two or more layers of a unidirectional fiber reinforced thermoplastic.

4. The rear shelf module of claim 3, wherein the shelf panel includes a second laminate including two or more layers of a unidirectional fiber reinforced thermoplastic wherein the first, and second laminates are consolidated into the shelf panel.

5. The rear shelf module of claim 4 further including a third laminate including two or more layers of a unidirectional fiber reinforced thermoplastic, wherein the first, second and third laminates are consolidated into the shelf panel.

6. The rear shelf module of claim 1, wherein the shelf panel includes two or more woven, continuous fiber reinforced thermoplastic layers.

7. The rear shelf module of claim 1, wherein the shelf panel includes a base shelf laminate including a plurality of layers, each layer having a fiber reinforced composite matrix; a structural laminate including a plurality of layers, each layer having a fiber reinforced composite matrix; a reinforcement laminate including a plurality of layers, each layer having a fiber reinforced composite matrix; and wherein the base shelf laminate, the structural laminate and the reinforcement laminate have different layering structures that combine to form at least a part of the shelf panel, wherein one or more of the plurality of layers of the structural laminate includes at least one unidirectional, continuous fiber reinforced thermoplastic layer.

8. The rear shelf module of claim 7, wherein the at least one unidirectional, continuous fiber reinforced thermoplastic layer of the structural laminate is a plurality of unidirectional, continuous fiber reinforced thermoplastic layers combined in different directional fiber orientations.

9. The rear shelf module of claim 8, wherein the plurality of unidirectional, continuous fiber reinforced thermoplastic layers combined in different fiber directional orientations of the structural laminate include 5 or more layers.

10. The rear shelf module of claim 7, wherein one or more of the plurality of layers of the reinforcement laminate includes at least one unidirectional, continuous fiber reinforced thermoplastic layer.

11. The rear shelf module of claim 10, wherein the at least one unidirectional, continuous fiber reinforced thermoplastic layer of the reinforcement laminate is a plurality of unidirectional, continuous fiber reinforced thermoplastic layers combined in different directional fiber orientations.

12. The rear shelf module of claim 11, wherein the plurality of unidirectional, continuous fiber reinforced thermoplastic layers of the reinforcement laminate combined in different directional fiber orientations include 7 or more layers.

13. The rear shelf module of claim 7, wherein the plurality of layers of the base shelf laminate include two or more woven, continuous fiber reinforced thermoplastic layers; the plurality of layers of the structural laminate include at least two unidirectional, continuous glass fiber reinforced thermoplastic layers; the plurality of layers of the reinforcement laminate include at least two unidirectional, continuous glass fiber reinforced thermoplastic layers.

14. The rear shelf module of claim 7, wherein the plurality of layers of the base shelf laminate include at least two unidirectional, continuous fiber reinforced thermoplastic layers; the plurality of layers of the structural laminate include at least two unidirectional, continuous glass fiber reinforced thermoplastic layers; the plurality of layers of the reinforcement laminate include at least two unidirectional, continuous glass fiber reinforced thermoplastic layers.

15. The rear shelf module of claim 9 wherein the plurality of layers of the structural laminate include layers with fiber orientations of 45 degrees, −45 degrees and 0 degrees.

16. The rear shelf module of claim 12 wherein the plurality of layers of the reinforcement laminate include layers with fiber orientations of 90 degrees, 45 degree, −45 degrees, and 0 degrees.

17. The rear shelf module of claim 7 wherein the reinforcement laminate is a composite tape encompassing an area smaller than that of either the base shelf laminate or the structural laminate.

18. The rear shelf module of claim 7 wherein the base shelf laminate and structural laminate are combined with a second base shelf laminate and a second structural laminate in a clam shell essentially closed cross car wise.

19. The rear shelf module of claim 7 further including a vehicle body bracket coupled to the shelf panel.

20. The rear shelf module of claim 1 wherein each layer of the shelf panel is from 0.10 mm to 1.30 mm in thickness.

* * * * *